US012659257B2

(12) United States Patent
Sai et al.

(10) Patent No.: US 12,659,257 B2
(45) Date of Patent: Jun. 16, 2026

(54) METHODS FOR ANALYZING FORECASTABILITY OF METRICS FROM MONITORING AGENTS IN COMPUTER NETWORK

(71) Applicant: SOLARWINDS WORLDWIDE, LLC, Austin, TX (US)

(72) Inventors: Krishna Sai, Austin, TX (US); Venkata Dikshitulu Pappu, Andhrapradesh (IN); Arjun Kini, Karnataka (IN); Sathvik Manikantan Napa Ugandhar, Chennai (IN)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 52 days.

(21) Appl. No.: 18/942,177

(22) Filed: Nov. 8, 2024

(65) Prior Publication Data

US 2026/0135794 A1 May 14, 2026

(51) Int. Cl.
*H04L 43/16* (2022.01)
*H04L 43/08* (2022.01)

(52) U.S. Cl.
CPC .............. *H04L 43/16* (2013.01); *H04L 43/08* (2013.01)

(58) Field of Classification Search
CPC ................................ H04L 43/08; H04L 43/16

USPC .......................................................... 709/238
See application file for complete search history.

(56) References Cited

U.S. PATENT DOCUMENTS

| | | | |
|---|---|---|---|
| 12,524,713 B2 * | 1/2026 | Brahmankar ....... | G06F 16/2477 |
| 2020/0067969 A1 * | 2/2020 | Abbaszadeh ........ | G06N 3/0499 |
| 2023/0179493 A1 * | 6/2023 | Jiwani ................. | H04L 41/5067 |
| | | | 455/423 |
| 2024/0412131 A1 * | 12/2024 | Wicaksono ........ | G06Q 10/0639 |
| 2025/0168181 A1 * | 5/2025 | Liu ........................ | G06N 3/045 |

FOREIGN PATENT DOCUMENTS

WO     WO-2025129335 A1 * 6/2025 ......... G06Q 30/0202

* cited by examiner

*Primary Examiner* — Glenford J Madamba
(74) *Attorney, Agent, or Firm* — SQUIRE PATTON BOGGS (US) LLP

(57) ABSTRACT

Systems, methods, apparatuses, and computer program products for forecasting network metrics. One method may include a computing device receiving metric data; extracting at least one time series property from the metric data; calculating at least one statistical measurement based upon the at least one time series property; performing ensemble scoring based upon the at least one statistical measurement; generating a forecastability score based upon the ensemble scoring; and determining forecastability of the metric data based upon a comparison of the forecastability score against a preset threshold.

11 Claims, 7 Drawing Sheets frequency time

CV: 0.912, CV_DIFF: 1.943e+02, CAPS_QCOD: 2.94e-01

CV: 0.916, CV_DIFF: 2.237e+00, CAPS_QCOD: 1.58e-01

CV: 1.257, CV_DIFF: -3.528e+03, CAPS_QCOD: 1.41e-01

METHODS FOR ANALYZING FORECASTABILITY OF METRICS FROM MONITORING AGENTS IN COMPUTER NETWORK

TECHNICAL FIELD

Some example embodiments may generally relate to forecasting network metrics between monitoring agents in a computer network.

BACKGROUND

Metric forecasting is an important aspect of modern information technology (IT) environments. Such metric forecasting enables IT systems to take proactive measures on future consumption patterns of computer resources. However, forecasting may be unreliable due to various factors, including uncertainty in behavioral patterns and external influences.

SUMMARY

In accordance with some example embodiments, a method may include receiving, by a computing device, metric data. The method may further include extracting, by the computing device, at least one time series property from the metric data. The method may further include calculating, by the computing device, at least one statistical measurement based upon the at least one time series property. The method may further include performing, by the computing device, ensemble scoring based upon the at least one statistical measurement. The method may further include generating, by the computing device, a forecastability score based upon the ensemble scoring. The method may further include determining, by the computing device, forecastability of the metric data based upon a comparison of the forecastability score against a preset threshold.

In accordance with certain example embodiments, an apparatus may include means for receiving metric data. The apparatus may further include means for extracting at least one time series property from the metric data. The apparatus may further include means for calculating at least one statistical measurement based upon the at least one time series property. The apparatus may further include means for performing ensemble scoring based upon the at least one statistical measurement. The apparatus may further include means for generating a forecastability score based upon the ensemble scoring. The apparatus may further include means for determining forecastability of the metric data based upon a comparison of the forecastability score against a preset threshold.

In accordance with various example embodiments, a non-transitory computer readable medium may include program instructions that, when executed by an apparatus, cause the apparatus to perform at least a method. The method may include receiving metric data. The method may further include extracting at least one time series property from the metric data. The method may further include calculating at least one statistical measurement based upon the at least one time series property. The method may include performing ensemble scoring based upon the at least one statistical measurement. The method may further include generating a forecastability score based upon the ensemble scoring. The method may further include determining forecastability of the metric data based upon a comparison of the forecastability score against a preset threshold.

In accordance with some example embodiments, a computer program product may perform a method. The method may include receiving metric data. The method may further include extracting at least one time series property from the metric data. The method may further include calculating at least one statistical measurement based upon the at least one time series property. The method may include performing ensemble scoring based upon the at least one statistical measurement. The method may further include generating a forecastability score based upon the ensemble scoring. The method may further include determining forecastability of the metric data based upon a comparison of the forecastability score against a preset threshold.

In accordance with certain example embodiments, an apparatus may include at least one processor and at least one memory storing instructions that, when executed by the at least one processor, cause the apparatus at least to receive metric data. The at least one memory and instructions, when executed by the at least one processor, may further cause the apparatus at least to receive metric data. The at least one memory and instructions, when executed by the at least one processor, may further cause the apparatus at least to calculate at least one statistical measurement based upon the at least one time series property. The at least one memory and instructions, when executed by the at least one processor, may further cause the apparatus at least to calculate at least one statistical measurement based upon the at least one time series property. The at least one memory and instructions, when executed by the at least one processor, may further cause the apparatus at least to perform ensemble scoring based upon the at least one statistical measurement. The at least one memory and instructions, when executed by the at least one processor, may further cause the apparatus at least to generate a forecastability score based upon the ensemble scoring. The at least one memory and instructions, when executed by the at least one processor, may further cause the apparatus at least to determine forecastability of the metric data based upon a comparison of the forecastability score against a preset threshold.

In accordance with various example embodiments, an apparatus may include receiving circuitry configured to perform receiving metric data. The apparatus may further include extracting circuitry configured to perform extracting at least one time series property from the metric data. The apparatus may further include calculating circuitry configured to perform calculating at least one statistical measurement based upon the at least one time series property. The apparatus may further include performing circuitry configured to perform performing ensemble scoring based upon the at least one statistical measurement. The apparatus may further include generating circuitry configured to perform generating a forecastability score based upon the ensemble scoring. The apparatus may further include determining circuitry configured to perform determining forecastability of the metric data based upon a comparison of the forecastability score against a preset threshold.

BRIEF DESCRIPTION OF THE DRAWINGS

For a proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for forecasting network metrics is not intended to limit the scope of certain example embodiments, but is instead representative of selected example embodiments.

Artificial intelligence operation (AIOp) service providers may provide metric forecasting services. However, these forecasting services may not provide end users with guidance on which metrics to forecast, resulting in uncertainty in the quality of forecasts, and unnecessarily consuming computing resources to run forecasting services despite the metrics being unforecastable.

Certain example embodiments described herein may have various benefits and/or advantages to overcome the disadvantages described above. For example, certain example embodiments may determine whether computer-based metrics are forecastable. Thus, certain example embodiments discussed below are directed to improvements in computer-related technology.

In order to generate a confidence of a model, a quality measurement of a time series may be used to evaluate forecastability. Such a quality measurement may be based upon a score indicating the forecastability of the time series, and may differentiate between different types of time series (e.g., smooth, spiky, series with regime changes). The quality measurement may also be aggregatable across multiple time series (disks/volumes) within a metric (e.g., percentage of disk used, average node volume) to provide an accurate estimate of the forecastability of the metric. The time series may also be sampled for each metric.

Figure 1:
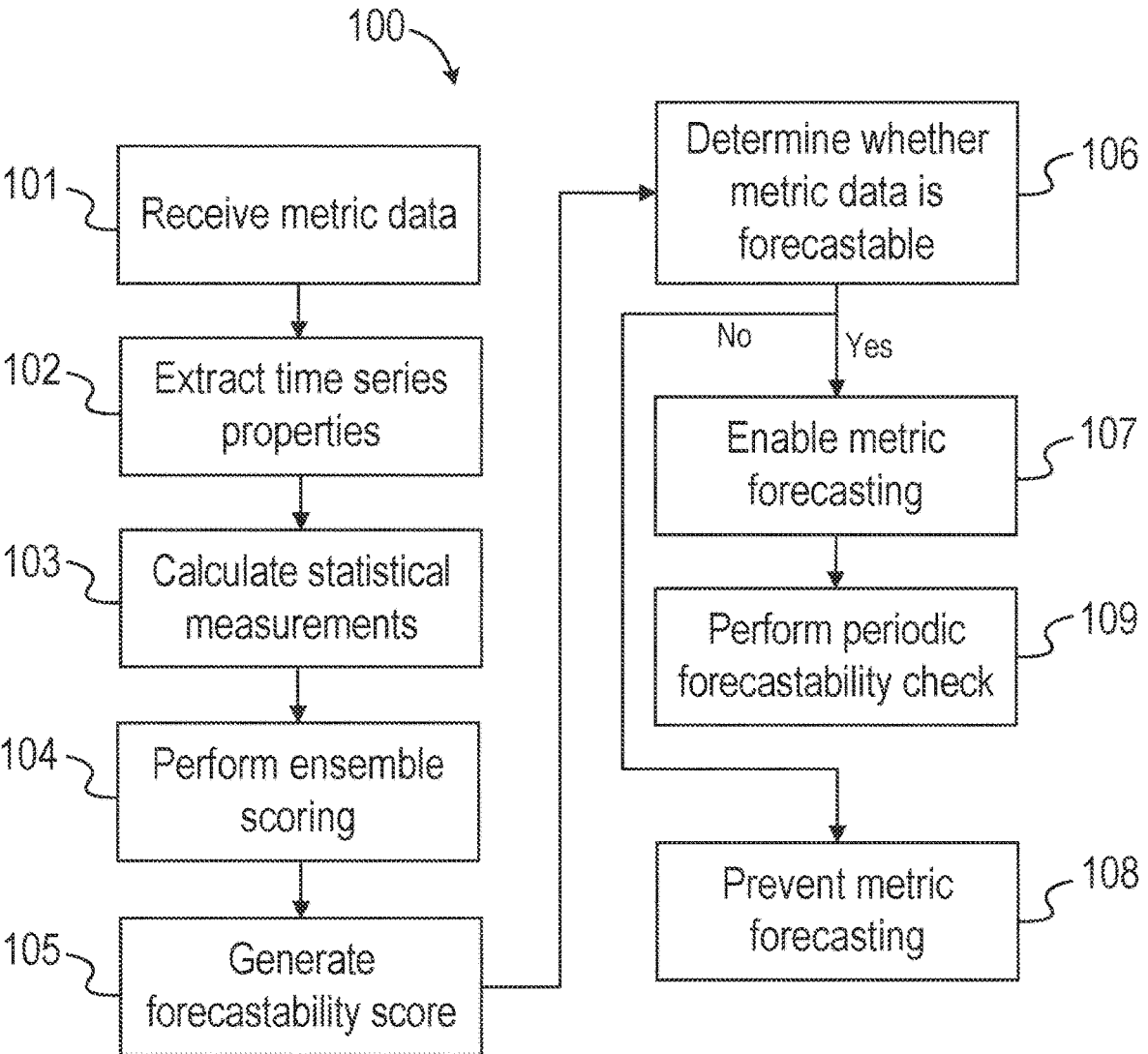
FIG. 1 illustrates an example of a flow diagram of a method according to certain example embodiments.
Figure 10:
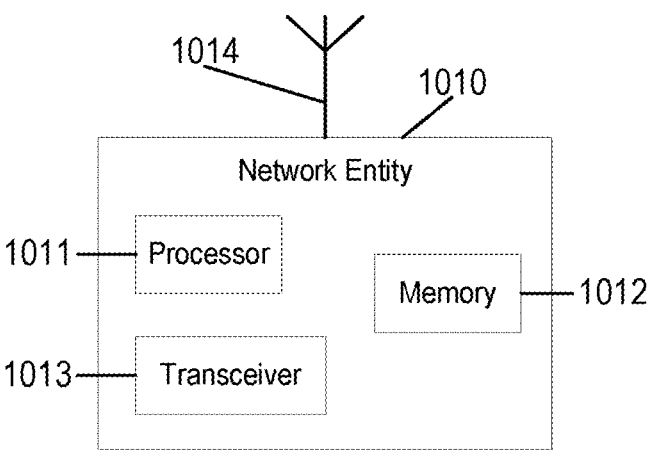
FIG. 10 illustrates an example of various network devices according to certain example embodiments.

FIG. 1 illustrates an example of a flow diagram of a method 100 that may be performed by a computing device, such as NE 1010 illustrated in FIG. 10, according to various example embodiments.

At step 101, the method may include receiving, by the computing device, metric data. In certain example embodiments, the metric data may include at least one of out percent utilization (i.e., current percentage of utilization of the bandwidth on the transmit side of the network interface); average load; average percentage of memory used, average response time; average input/output operations per second total; average input/output operations per second read; average input/output operations per second write; average total latency; average read latency; average write latency; percentage of disk used; or any other type of metric data.

At step 102, the method may further include extracting, by the computing device, at least one time series property from the metric data utilizing various statistical and mathematical methods, for example, change point detection for identifying trends and seasonality, and peak detection algorithm based on statistical measures for identifying spikes and dips.

In some example embodiments, the at least one time series property may include at least one of trend, seasonality, cyclicity, spikes, and dips.

At step 103, the method may further include calculating, by the computing device, at least one statistical measurement based upon the at least one time series property. In various example embodiments, the at least one statistical measurement may include at least one of dispersion, spectral density, residual variability, and Omega score.

According to various example embodiments, residual variability may be determined by training a baseline model on a training window data (e.g., Prophet forecasting by Python or R), and performing predictions on the same training window (e.g., overfitting the model to determine how Prophet perceives the trend and seasonality of the data). Residuals may be calculated as res=y−ŷ, wherein y is an actual value, and ŷ is a predicted value for a given timestamp. Residuals may provide additional variability that exists in the time series that the baseline model may be unable to capture. Standard deviation of the residuals may be a measure of the noise present in the time series, and scaled using the mean of actual values and a dampening factor. Thus, noise=0.5*(stdev (residuals)/mean (actuals)). A final forecastability score FCST may then be calculated according to FCST=1−noise. FCST may also be calculated as a weighted combination of any of the previously-discussed scores.

In certain example embodiments, calculating the at least one statistical measurement may further include calculating, by the computing device, spectrum of at least one signal, and power spectral density of the at least one signal via squaring amplitude of the at least one signal. The computing device may then normalize the at least one signal by a number of bins, and the calculated power spectral density into a probability density function. The method may further include the computing device calculating power spectral entropy according to a standard entropy calculation formula, and determining whether the normalized power spectral density indicates a forecastable series or non-forecastable noisy series.

Figure 2:
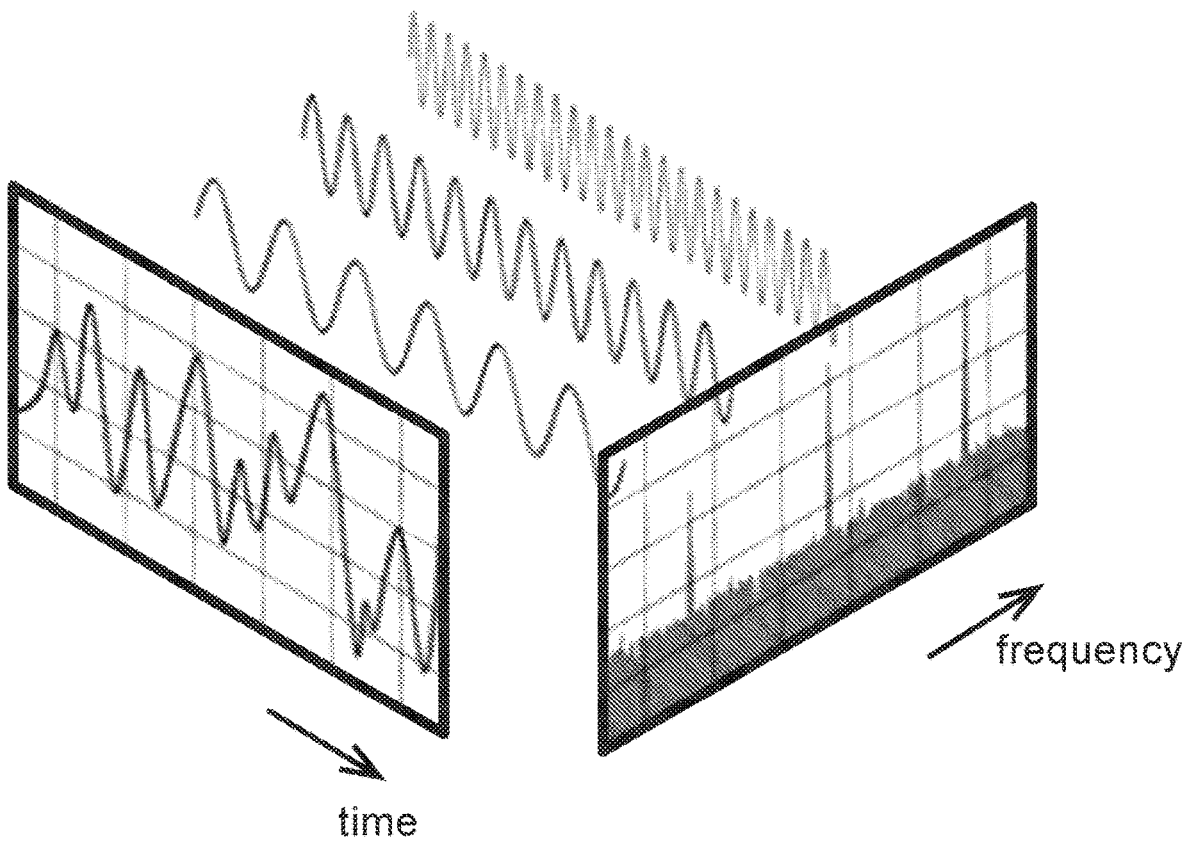
FIG. 2 illustrates a calculation of spectrum $|X(\omega_i)|^2$ of a signal calculated using Fourier transforms which may convert a time-based signal into a frequency domain by estimating the frequencies that the original signal according to some example embodiments.

Spectral entropy (SE) may include a nonlinear method to summarize signal power irregularities over measured frequencies, and may be a measure used to describe the complexity of a time series. Spectrum $|X(\omega_i)|^2$ transforms which convert a time-based signal into a frequency domain by estimating the frequencies that the original signal could be made up of, as shown in FIG. 2. The power spectral density of the signal may be calculated by squaring its amplitude and normalizing by the number of bins, according to $$P(w_i) = \frac{1}{N}|X(w_i)|^2.$$

5

The calculated PSD may be normalized such that it may be viewed as a probability density function, according to $$p_i = \frac{P(w_i)}{\sum_i P(w_i)}.$$

The power spectral entropy may then be calculated using a standard formula for an entropy calculation, such as $$PSE = -\sum_{i=1}^{n} p_i \ln p_i.$$

The normalized PSE may yield a value of 0 for a forecastable series, and 1 for a non-forecastable noisy series. 1−PSE may be the forecastability score Omega. Thus, $0 \leq Omega \leq 1$, where a lower Omega indicates a lower forecastability, and a higher Omega indicates a higher forecastability.

According to some example embodiments, the method may further include calculating the Omega score according to one minus the power spectral entropy. As an example, calculating the Omega score as less than one may indicate forecastability.

At step 104, the method may further include performing, by the computing device, ensemble scoring based upon the at least one statistical measurement.

In some example embodiments, ensemble scoring may include selecting an appropriate method to generate a forecastability score from the candidate approaches, including any combination of FCST, spectral entropy, and/or coefficient of variation (i.e., dispersion). Specifically, FCST may assess the forecastability of a metric by fitting a Prophet model on the metric data, and evaluating the residuals. FCST may efficiently capture seasonal and cyclical trends, and may be more reliable for metrics with substantial data (e.g., spanning multiple days). Furthermore, spectral entropy may be preferable for metrics with relatively fewer data points. Spectral entropy may decompose the time series into individual time and frequency components, isolate the noise, and evaluate the resulting components for forecastability. Spectral entropy may be particularly effective in cases where FCST is not preferred due to noisy (i.e., irregular patterns) and/or sparse (i.e., data collected infrequently or the data that rarely changes over time) data points. In addition, dispersion may be used to calculate the variability of metric data, with the extent of variability determining the forecastability as measured by FCST and/or spectral entropy, as previously described.

At step 105, the method may further include generating, by the computing device, a forecastability score based upon the ensemble scoring. For example, the forecastability score may be an outcome of the ensemble scoring at step 104. The forecastability score may be based upon one selected method (e.g., FCST, spectral entropy, coefficient of variation) or an aggregated score (e.g., average) of multiple selected methods based on any combination of seasonal patterns, noise, and number of data points observed.

At step 106, the method may further include determining, by the computing device, forecastability of the metric data based upon a comparison of the forecastability score against a preset threshold, which may be determined by statistical aggregation of historical forecastability scores.

At step 107, the method may further include, upon determining that the metric data is forecastable, enabling, by the computing device, metric forecasting. For example, metric forecasting may include the computing device using the time series data for a metric to forecast the metric values for future periods. Enablement of metric forecasting may include allowing the computing device to perform metric forecasting for a chosen set of metrics deemed forecastable.

At step 108, the method may further include, upon determining that the metric data is not forecastable, preventing, by the computing device, metric forecasting. Disablement of metric forecasting may include preventing the computing device from performing metric forecasting for a chosen set of metrics deemed not forecastable.

At step 109, the method may further include performing, by the computing device, at least one periodic forecastability check.

As noted above, a forecastability metric (i.e., Omega score) may indicate uncertainty of a given time series. The Omega score may be aggregatable across the given time series within a metric, and may indicate forecastability of a metric. In order to determine Omega score, minute/hour data for 3 days may be used to calculate Omega score for the metric. Three days of data being sufficient enough to generalize forecastability of a metric can be substantiated by the Pearson correlation score between 3 days of data, and all days (e.g., 10) of data. A high correlation score may occur when the metric has a more forecastable time series, such as flat trends and logistic growth trends. A low correlation score may indicate that the metric has varying trends in the data, and uncertainty may not be constant across all days.

Tables 1-6 below provide a series of metrics that were evaluated for forecastability with the best and least scores, along with an Omega score range to improve interpretation of the forecastability. The metric covers diverse types of signals ranging from flat trends to highly volatile signals.

TABLE 1

| | CPULoad - Omega Score Range: 0.12-0.379 | | |
| --- | --- | --- | --- |
| | CPULoad_CS_Daily AvgLoad | CPUMultiLoad_CS_Hourly_hist AvgLoad | VIM_CloudInstanceStatistics_Detail AvgCPULoad |
| count | 1267.000 | 910.000 | 90.000 |
| mean | 0.379 | 0.282 | 0.115 |
| std | 0.265 | 0.284 | 0.159 |
| min | 0.000 | 0.000 | 0.001 |
| 25% | 0.164 | 0.094 | 0.013 |
| 50% | 0.330 | 0.157 | 0.059 |
| 75% | 0.491 | 0.374 | 0.136 |
| max | 1.000 | 1.000 | 0.734 |
| interquartile range | 0.327 | 0.280 | 0.124 |

CPULoad_CS-AvgLoad has a beneficial mean Omega score, attributed to a plurality of time series that are mostly flat with minute intermittent spikes. Upon manual inspection, some of these time series may appear to be cyclic and/or have the potential to be forecastable after transformations on the data.

TABLE 2

| | VIM_CloudInstanceStatis-tics_Detail - MaxIOPSWrite | VIM_CloudInstanceStatis-tics_Detail - MaxIOPSRead | SRM_LUNStatistics_Detail - IOPSOther | SRM_VolumeStatistics_Detail - IOPSTotal |
|---|---|---|---|---|
| | IOPS - Omega Score Range: 0.16-0.931 | | | |
| count | 90.000 | 90.000 | 28.000 | 15.000 |
| mean | 0.931 | 0.926 | 0.891 | 0.162 |
| std | 0.240 | 0.255 | 0.269 | 0.162 |
| min | 0.028 | 0.039 | 0.049 | 0.016 |
| 25% | 1.000 | 1.000 | 1.000 | 0.050 |
| 50% | 1.000 | 1.000 | 1.000 | 0.091 |
| 75% | 1.000 | 1.000 | 1.000 | 0.192 |
| max | 1.000 | 1.000 | 1.000 | 0.472 |
| interquartile range | 0.000 | 0.000 | 0.000 | 0.143 |

While the range of VIM_CloudInstanceStatistics_Detail may be helpful, 92% of the data has an Omega score of 1 due to flat trends. The remaining 8% has a max Omega Score of 0.139, attributed to highly volatile graphs, making this metric unforecastable. SRM_LUNStatistics_Detail only has 28 hashes, of which 16 have flat trends. The remaining data has intermittent spikes on a flat trend, which have a low Omega score<0.3. SRM_VolumeStatistics_Detail only has 15 hashes, which all have flat trends with intermittent spikes, thus giving a lower Omega score.

TABLE 3

| | SEUM_Re-sponseTime_Detail - Duration | SEUM_Re-sponseTime_Daily - AvgDuration | SEUM_Re-sponseTime_Daily - MinDuration | SEUM_Re-sponseTime_Daily - MaxDuration |
|---|---|---|---|---|
| | Response Time - Omega Score Range: 0.24-0.603 | | | |
| count | 17.000 | 83.000 | 83.000 | 83.000 |
| mean | 0.603 | 0.243 | 0.242 | 0.240 |
| std | 0.490 | 0.337 | 0.338 | 0.337 |
| min | 0.006 | 0.000 | 0.000 | 0.000 |
| 25% | 0.035 | 0.067 | 0.063 | 0.058 |
| 50% | 1.000 | 0.095 | 0.093 | 0.095 |
| 75% | 1.000 | 0.156 | 0.167 | 0.159 |
| max | 1.000 | 1.000 | 1.000 | 1.000 |
| interquartile range | 0.965 | 0.090 | 0.104 | 0.101 |

SEUM_ResponseTime_Detail-Duration has only 17 data points, out of which 10 are flat. Thus, the high score of 0.603 may not provide much of an indication. The remaining 7 hashes have a low Omega score<0.1 attributed to a flat trend with many intermittent spikes. SEUM_Response Time_Daily consists of many volatile time series covering a large range of values, all achieving an Omega score<0.1.

TABLE 4

| | CPULoad_CS_Daily - Percent MemoryUsed | CPULoad_CS_Hourly - Percent MemoryUsed | VIM_ClusterStatis-tics_CS_Detail_hist - MaxMemory UsageMB | MemoryMultiLoad_Detail - AvgPercent MemoryUsed |
|---|---|---|---|---|
| | Memory Usage - Omega Score Range: 0.073-0.456 | | | |
| count | 1267.000 | 1045.000 | 40.000 | 53.000 |
| mean | 0.456 | 0.396 | 0.118 | 0.073 |

TABLE 4-continued

| Memory Usage - Omega Score Range: 0.073-0.456 | | | |
| --- | --- | --- | --- |
| | CPULoad_CS_Daily - Percent MemoryUsed | CPULoad_CS_Hourly - Percent MemoryUsed | VIM_ClusterStatistics_CS_Detail_hist - MaxMemory UsageMB | MemoryMultiLoad_Detail - AvgPercent MemoryUsed |
| std | 0.200 | 0.199 | 0.171 | 0.060 |
| min | 0.000 | 0.007 | 0.047 | 0.018 |
| 25% | 0.301 | 0.255 | 0.059 | 0.033 |
| 50% | 0.428 | 0.373 | 0.068 | 0.065 |
| 75% | 0.612 | 0.520 | 0.085 | 0.073 |
| max | 1.000 | 1.000 | 1.000 | 0.262 |
| interquartile range | 0.311 | 0.266 | 0.026 | 0.040 |

CPULoad_CS_Daily and CPULoad_CS_Hourly have a similar distribution of Omega scores as the DiskCapacity metric, and is very likely to be forecastable. VIM_ClusterStatistics_CS_Detail_hist has very volatile graphs that are not forecastable. The signal in the time series frequently dips to 0, hence decreasing the Omega score. MemoryMultiLoad_Detail may be unforecastable as well.

provide a full picture. While it may indicate that one metric may be more volatile, it doesn't indicate whether this volatility can be fit using a model like Prophet. Forecastable metrics according to Omega score comparison include CPULoad and MemoryUsage. Other metrics with intermittent spikes and flat trends could be forecastable with some data transformations, such as scaling and using filters.

TABLE 5

| Percent Availability: Omega Score Range: 0.221-0.784 | | | |
| --- | --- | --- | --- |
| | VIM_ClusterStatistics_CS_Detail_hist - Percent Availability | SEUM_ResponseTime_Detail - Percent Availability | APM_ApplicationStatus_Daily - Percent Availability | SEUM_ResponseTime_Daily - Percent Availability |
| count | 40.000 | 17.000 | 1487.000 | 76.000 |
| mean | 1.000 | 0.784 | 0.288 | 0.221 |
| std | 0.000 | 0.387 | 0.356 | 0.299 |
| min | 1.000 | 0.001 | 0.000 | 0.000 |
| 25% | 1.000 | 0.651 | 0.078 | 0.069 |
| 50% | 1.000 | 1.000 | 0.120 | 0.104 |
| 75% | 1.000 | 1.000 | 0.272 | 0.176 |
| max | 1.000 | 1.000 | 1.000 | 1.000 |
| interquartile range | 0.000 | 0.349 | 0.193 | 0.107 |

VIM_ClusterStatistics_CS_Detail_hist may only have flat trends, so this may be safely ignored. All other metrics have signals that fluctuate between 0 and 100 in an intermittent fashion. Thus, these metrics may be unforecastable.

TABLE 6

| RequestsPerSec - Omega Score: 0.971 |
| --- |
| | F5_LTM_VirtualServer_Detail - RequestsPerSec |
| count | 267.000 |
| mean | 0.971 |
| std | 0.157 |
| min | 0.008 |
| 25% | 1.000 |
| 50% | 1.000 |
| 75% | 1.000 |
| max | 1.000 |
| interquartile range | 0.00 |

The metric has only 9 hashes with non-flat trends. These may have a low Omega score due to their irregularity, thus making the metric unforecastable.

Figure 3:
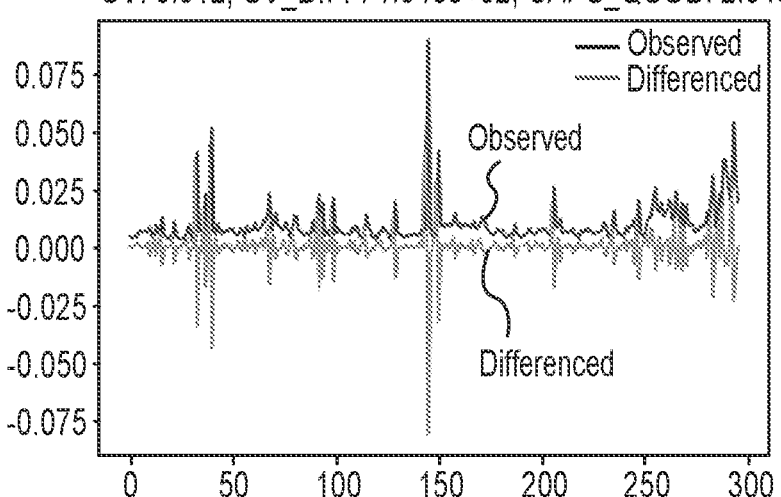
FIGS. 3-5 illustrate coefficient of variation and quartile coefficient of dispersion as measurements of volatility/dispersion according to various example embodiments.
Figure 4:
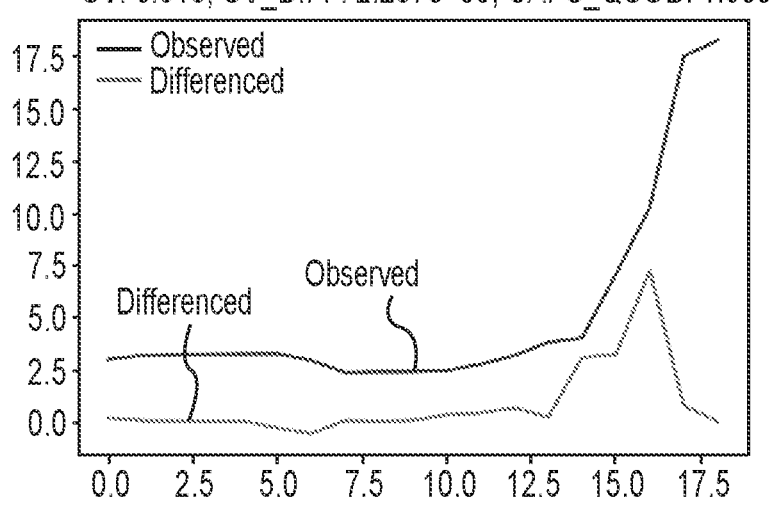
Figure 4:
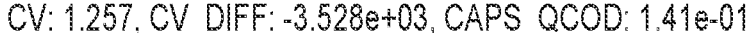
Figure 5:
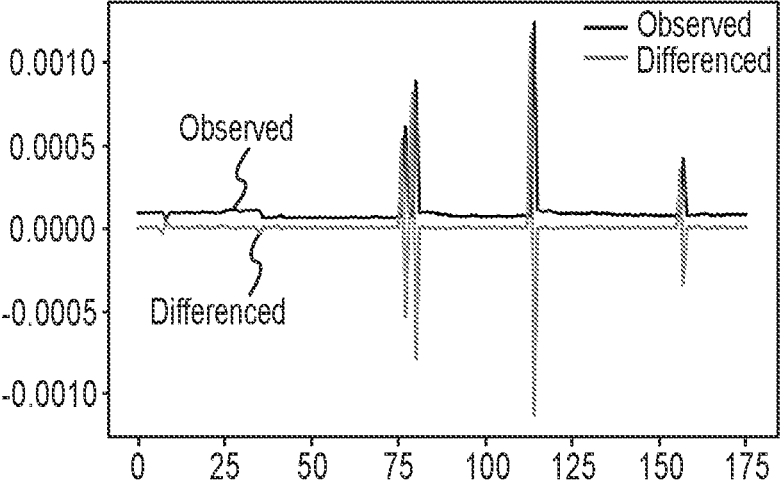

Thus, the Omega score provides a general view of the forecastability of a metric as a measure of the randomness in the time series for each hashed ID. However, given the nature of time series modeling, this measure does not In some example embodiments, forecastability of the data may be based upon dispersion, which may be determined by the coefficient of variation of the time series data which is a measure of relative variability as a ratio of the standard deviation to the mean. Specifically, the forecastability of the data may be interpreted as the amount of volatility in the data, wherein more variation may correlate with less forecastability of the series. The coefficient of variation and quartile coefficient of dispersion may be measurements of volatility/dispersion of the data, such as shown in FIGS. 3-5. In particular, FIGS. 3-5 illustrate coefficient of variation and quartile coefficient of dispersion as measurements of volatility/dispersion according to certain example embodiments. In FIG. 3, the values in the differenced (a method used to remove the influence of trend and seasonality in the time series) plot exhibit high variation (e.g., 194.3). In FIG. 4, the differenced plot is much smoother and has a single peak, leading to a low coefficient of variation (e.g., 2.237). In FIG. 5, the differenced plot exhibits spikes with a very high magnitude which leads to a very high absolute coefficient of variation (e.g., 3528). The reason we opt for an absolute score is because the mean can be negative, and we are only interested in the extent of variation.

In an effort to mitigate the error caused by measuring only the distribution of data, a diff operation may be performed on the series (i.e., difference between consecutive values), and then measured the coefficient of variation. This results in an extremely large values as the mean is close to 0 upon differencing the series.

|       | caps_mean | caps_std     | caps_cov  | caps_qcod | range        | caps_cov_diff  | caps_qcod_diff |
|-------|-----------|--------------|-----------|-----------|--------------|----------------|----------------|
| count | 3277.000000 | 3.277000e+03 | 3277.000000 | 3277.000000 | 3.277000e+03 | 3.277000e+03 | 3.277000e+03 |
| mean  | 41.654525 | 3.938330e+00 | 0.167061  | 0.082605  | 1.830680e+01 | −3.009141e+14 | inf |
| std   | 26.038475 | 4.464607e+00 | 0.428798  | 0.133732  | 1.816528e+01 | 2.381549e+16 | NaN |
| min   | 0.000084  | 6.510537e−10 | 0.000003  | 0.000000  | 3.700000e−09 | −1.302056e+18 | −1.047141e+14 |
| 25%   | 20.542481 | 8.337687e−01 | 0.033669  | 0.015176  | 4.002450e+00 | −2.463803e+01 | 7.816412e−01 |
| 50%   | 42.951532 | 2.683186e+00 | 0.083443  | 0.045042  | 1.304052e+01 | 1.095277e+01 | 1.839259e+00 |
| 75%   | 61.396343 | 5.416971e+00 | 0.149442  | 0.088551  | 2.754831e+01 | 5.383395e+01 | 4.999898e+00 |
| max   | 99.446900 | 3.958228e+01 | 10.714611 | 1.000000  | 9.986989e+01 | 3.957890e+17 | inf |

The measures of variation do not completely indicate the forecastability of a time series. It may be beneficial to further perform obtaining and measuring the trend, seasonality and noise components of a time series; determining forecastability using uncertainty of fit and prediction in Prophet; and redefining forecastability as the least error our models can achieve and measure it using baseline methods for every forecast across multiple time periods.

Figure 6:
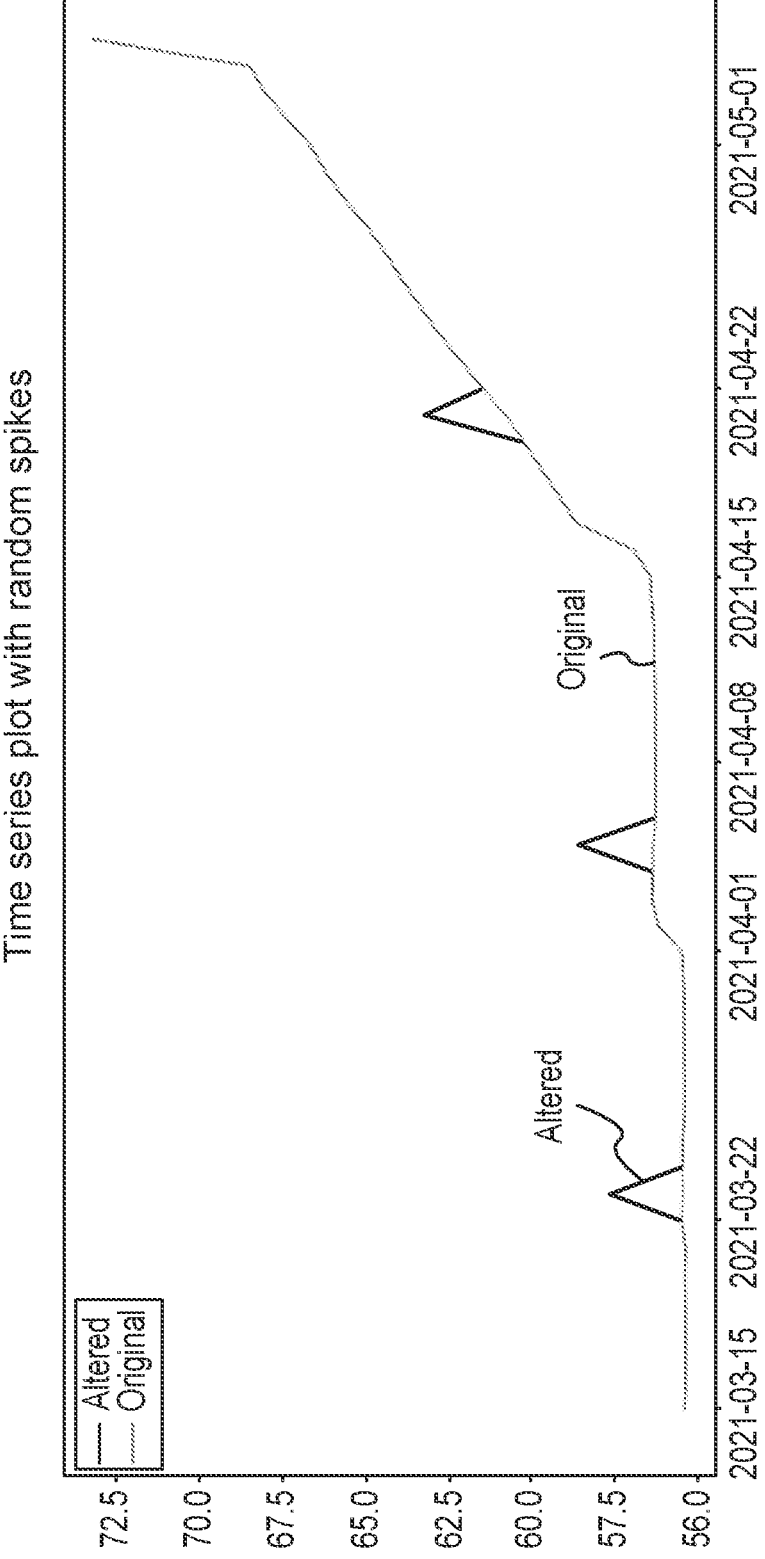
FIG. 6 illustrates the shift in PSD affecting the spectral entropy according to certain example embodiments.
Figure 7:
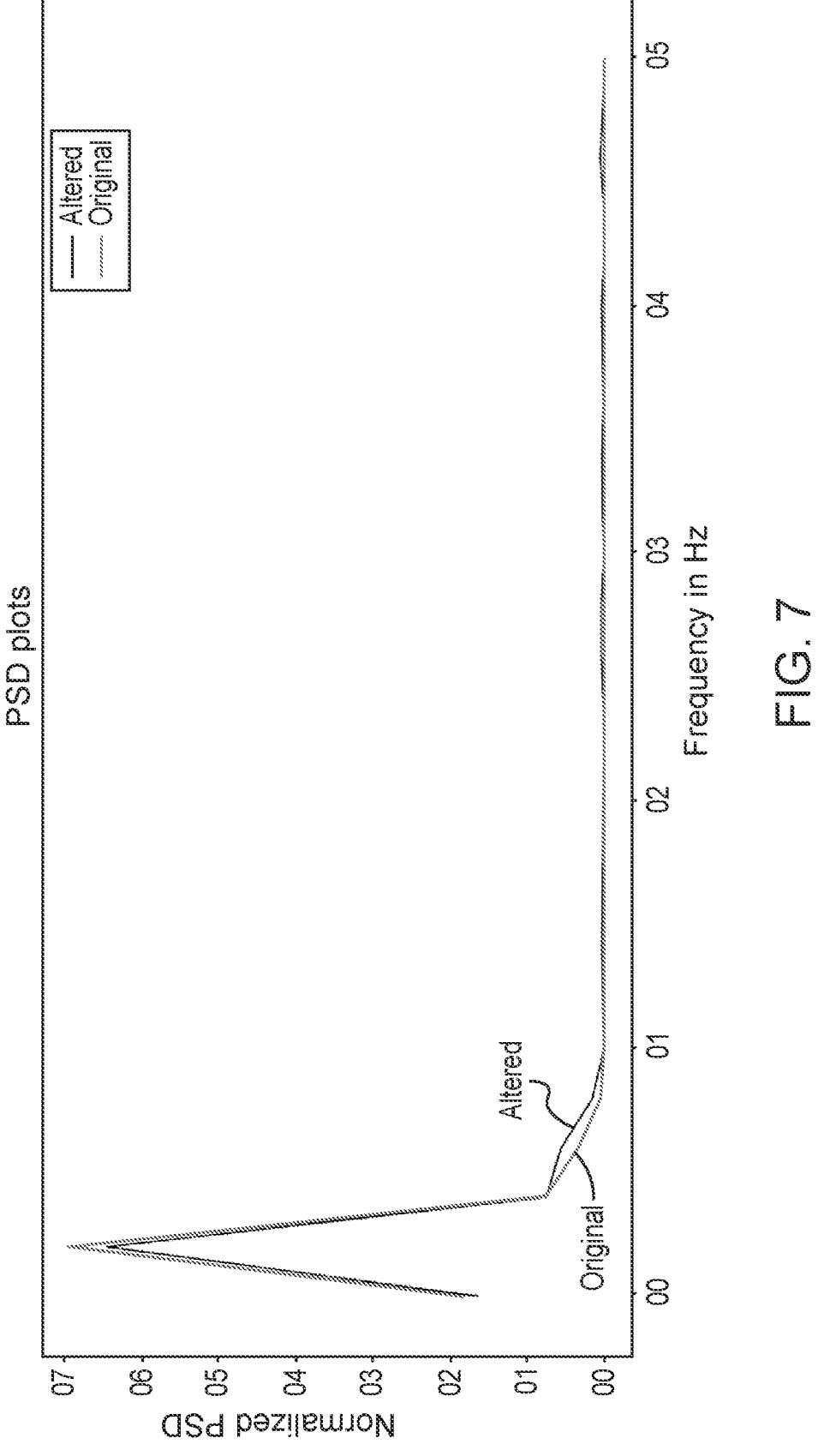
FIG. 7 illustrate the shift in PSD affecting the Omega score according to certain example embodiments.

In order to demonstrate the relationship between PSD and Omega score, spikes may be randomly added to a signal, and altered metric may be compared to original metrics. As shown in FIGS. 6 and 7, the shift in PSD may affect the spectral entropy and the Omega score, resulting in a drop in the Omega scores. The following table compares the Omega and FCST scores:

|          | FCST  | Omega |
|----------|-------|-------|
| Original | 0.995 | 0.704 |
| Altered  | 0.993 | 0.610 |

In forecasting data with a 70% capacity threshold, the tables below provide 1, 5, 10, 15, 20 and 20+ (OOF) days' deviation accuracy while forecasting. The distribution of Omega scores may be compared with FCST scores for each of the accuracy bins to indicate how they differ.

TABLE 7

| Omega scores | | | | | | |
|--------------|-------|-------|--------|--------|--------|-------|
| Omega Scores | 1 day | 5 day | 10 day | 15 day | 20 day | OOF |
| count | 10 | 30 | 37 | 24 | 23 | 243 |
| Train Set | | | | | | |
| mean | 0.527 | 0.430 | 0.473 | 0.437 | 0.413 | 0.364 |
| std  | 0.230 | 0.246 | 0.211 | 0.184 | 0.164 | 0.196 |
| min  | 0.218 | 0.102 | 0.143 | 0.147 | 0.091 | 0.009 |
| 25%  | 0.351 | 0.239 | 0.286 | 0.289 | 0.303 | 0.214 |

TABLE 7-continued

| Omega scores | | | | | | |
|--------------|-------|-------|--------|--------|--------|-------|
| Omega Scores | 1 day | 5 day | 10 day | 15 day | 20 day | OOF |
| 50% | 0.507 | 0.383 | 0.442 | 0.467 | 0.405 | 0.336 |
| 75% | 0.690 | 0.607 | 0.622 | 0.575 | 0.524 | 0.472 |
| max | 0.905 | 0.892 | 0.879 | 0.738 | 0.797 | 1.000 |
| Test Set | | | | | | |
| mean | 0.523 | 0.390 | 0.450 | 0.382 | 0.425 | 0.421 |
| std  | 0.216 | 0.207 | 0.215 | 0.214 | 0.215 | 0.193 |
| min  | 0.219 | 0.108 | 0.117 | 0.122 | 0.118 | 0.056 |
| 25%  | 0.367 | 0.241 | 0.271 | 0.210 | 0.247 | 0.252 |
| 50%  | 0.552 | 0.336 | 0.492 | 0.312 | 0.356 | 0.414 |
| 75%  | 0.642 | 0.496 | 0.625 | 0.603 | 0.636 | 0.579 |
| max  | 0.872 | 0.876 | 0.854 | 0.784 | 0.805 | 0.922 |

TABLE 8

| FCST scores | | | | | | |
|-------------|-------|-------|--------|--------|--------|-------|
| FCST Scores | 1 day | 5 day | 10 day | 15 day | 20 day | OOF |
| count | 10 | 30 | 37 | 24 | 23 | 243 |
| Train Set | | | | | | |
| mean | 0.992 | 0.987 | 0.985 | 0.981 | 0.979 | 0.970 |
| std  | 0.012 | 0.018 | 0.026 | 0.027 | 0.027 | 0.151 |
| min  | 0.959 | 0.940 | 0.858 | 0.897 | 0.892 | −1.309 |
| 25%  | 0.993 | 0.985 | 0.990 | 0.974 | 0.967 | 0.976 |
| 50%  | 0.996 | 0.995 | 0.996 | 0.995 | 0.993 | 0.993 |
| 75%  | 0.997 | 0.997 | 0.998 | 0.999 | 0.996 | 1.000 |
| max  | 1.000 | 1.000 | 1.000 | 1.000 | 1.000 | 1.000 |
| Test Set | | | | | | |
| mean | 0.983 | 0.975 | 0.979 | 0.977 | 0.966 | 0.933 |
| std  | 0.013 | 0.026 | 0.025 | 0.019 | 0.034 | 0.094 |
| min  | 0.961 | 0.901 | 0.876 | 0.940 | 0.883 | 0.408 |
| 25%  | 0.978 | 0.971 | 0.977 | 0.970 | 0.955 | 0.930 |
| 50%  | 0.983 | 0.985 | 0.987 | 0.981 | 0.975 | 0.963 |
| 75%  | 0.995 | 0.992 | 0.993 | 0.992 | 0.991 | 0.986 |
| max  | 1.000 | 0.998 | 1.000 | 0.997 | 1.000 | 0.999 |

TABLE 9

| Spectral entropy across metrics | | | | | |
|---|---|---|---|---|---|
| | SRM-LUN CapacityStatistics CapacityAllocated | SRM-Pool CapacityStatistics CapacityUserUsed | VIM-ClusterStatistics AvgCPULoad | VIM-ClusterStatistics AvgMemoryUsageMB | Disk Capacity |
| count | 48 | 20 | 62 | 62 | 282 |
| Omega Scores | | | | | |
| mean | 0.855 | 0.719 | 0.262 | 0.255 | 0.475 |
| std  | 0.196 | 0.235 | 0.245 | 0.284 | 0.208 |
| min  | 0.073 | 0.178 | 0.000 | 0.000 | 0.100 |
| 25%  | 0.711 | 0.623 | 0.066 | 0.055 | 0.294 |
| 50%  | 1.000 | 0.676 | 0.126 | 0.083 | 0.462 |
| 75%  | 1.000 | 0.894 | 0.490 | 0.533 | 0.652 |
| max  | 1.000 | 1.000 | 1.000 | 1.000 | 0.947 |

TABLE 9-continued

| | | Spectral entropy across metrics | | | |
|---|---|---|---|---|---|
| | SRM-LUN CapacityStatistics CapacityAllocated | SRM-Pool CapacityStatistics CapacityUserUsed | VIM-ClusterStatistics AvgCPULoad | VIM-ClusterStatistics AvgMemoryUsageMB | Disk Capacity |
| | | | FCST scores | | |
| mean | 0.989885 | 0.988466 | 0.879698 | 0.929921 | 0.968703 |
| std | 0.031114 | 0.026194 | 0.136573 | 0.093079 | 0.045537 |
| min | 0.824441 | 0.909005 | 0.052074 | 0.308826 | 0.523841 |
| 25% | 0.998362 | 0.996561 | 0.871240 | 0.938830 | 0.960144 |
| 50% | 1.000000 | 0.999593 | 0.918318 | 0.942603 | 0.980371 |
| 75% | 1.000000 | 0.999992 | 0.935833 | 0.948662 | 0.993841 |
| max | 1.000000 | 1.000000 | 1.000000 | 1.000000 | 0.999999 |

Figures 8, 9:
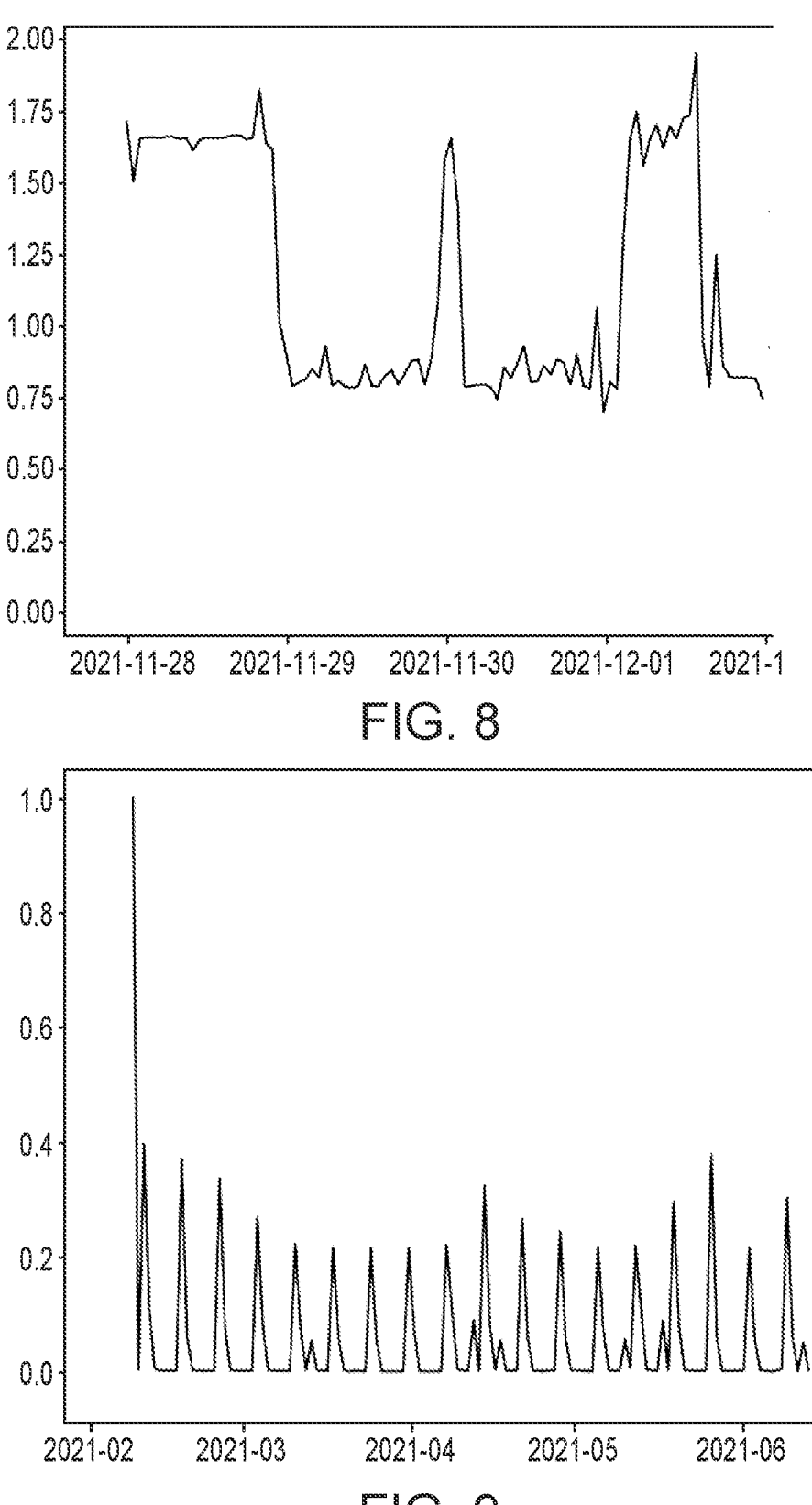
FIG. 8 depicts a noisy plot of average CPU load from a machine according to some example embodiments.
FIG. 9 depicts a seasonal plot of average disk reads from a machine according to various example embodiments.

FIG. 8 illustrates a plot with random spikes and dips without seasonality in the time series data of average CPU load from a machine. This time series data results in a low forecastability score.

FIG. 9 illustrates seasonal plot of average disk reads from a machine with uniform spikes and dips with a high forecastability score.

FIG. 10 illustrates an example of a system according to certain example embodiments. In one example embodiment, a system may include multiple devices, such as, for example, NE 1010.

NE 1010 may be one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 1010 may include at least one processor, indicated as 1011. Processor 1011 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1012. The memory may be fixed or removable. The memory may include computer program instructions or computer code contained therein. Memory 1012 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processor 1011, memory 1012, and any subset thereof, may be configured to provide means corresponding to the various blocks of FIG. 1. Although not shown, the devices may also include positioning hardware, such as GPS or micro electrical mechanical system (MEMS) hardware, which may be used to determine a location of the device.

Other sensors are also permitted, and may be configured to determine location, elevation, velocity, orientation, and so forth, such as barometers, compasses, and the like.

As shown in FIG. 10, transceiver 1013 may be provided, and one or more devices may also include at least one antenna, illustrated as 1014. The device may have many antennas, such as an array of antennas configured for multiple input multiple output (MIMO) communications, or multiple antennas for multiple RATs. Other configurations of these devices, for example, may be provided. Transceiver 1013 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIG. 1). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIG. 1. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

According to certain example embodiments, processor 1011 and memory 1012 may be included in or may form a part of processing circuitry or control circuitry. In addition, in some example embodiments, transceiver 1013 may be included in or may form a part of transceiving circuitry.

In some example embodiments, an apparatus (e.g., NE 1010) may include means for performing a method, a process, or any of the variants discussed herein. Examples of the means may include one or more processors, memory, controllers, transmitters, receivers, and/or computer program code for causing the performance of the operations.

In various example embodiments, apparatus 1010 may be controlled by memory 1012 and processor 1011 to extract at least one time series property from the metric data; calculate at least one statistical measurement based upon the at least one time series property; perform ensemble scoring based upon the at least one statistical measurement; generate a forecastability score based upon the ensemble scoring; and determine forecastability of the metric data based upon a comparison of the forecastability score against a preset threshold.

Certain example embodiments may be directed to an apparatus that includes means for performing any of the methods described herein including, for example, means for means for receiving metric data; means for extracting at least one time series property from the metric data; means for calculating at least one statistical measurement based upon the at least one time series property; means for performing ensemble scoring based upon the at least one statistical measurement; means for generating a forecastability score based upon the ensemble scoring; and means for determining forecastability of the metric data based upon a comparison of the forecastability score against a preset threshold.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof. One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

AIOp Artificial Intelligence Operation
CPU Central Processing Unit
FCST Forecastability Score
GPS Global Positioning System
PDA Personal Digital Assistance
ROM Read-Only Memory
SE Spectral Entropy

We claim:

1. A method comprising:

receiving, by a computing device, metric data;

extracting, by the computing device, at least one time series property from the metric data;

calculating, by the computing device, at least one statistical measurement based upon the at least one time series property, wherein the at least one statistical measurement comprises at least one of:

dispersion;

spectral density;

residual variability; and

Omega score;

performing, by the computing device, ensemble scoring based upon the at least one statistical measurement;

generating, by the computing device, a forecastability score based upon the ensemble scoring;

determining, by the computing device, forecastability of the metric data based upon a comparison of the forecastability score against a preset threshold;

calculating, by the computing device, the Omega score according to one minus a power spectral entropy, wherein calculating the Omega score as less than one indicates forecastability;

upon determining that the metric data is not forecastable, preventing, by the computing device, metric forecasting; and upon determining that the metric data is forecastable, enabling, by the computing device, metric forecasting.

2. The method of claim 1, further comprising:

performing, by the computing device, at least one periodic forecastability check.

3. The method of claim 1, wherein the metric data comprises at least one of:

out percent utilization;

average load;

average percentage of memory used;

average response time;

average input/output operations per second total;

average input/output operations per second read;

average input/output operations per second write;

average total latency;

average read latency;

average write latency;

percentage of disk used; and any other type of metric data.

4. The method of claim 1, wherein the at least one time series property comprises at least one of:

trend;

seasonality;

cyclicity;

spikes; and dips.

5. The method of claim 1, wherein calculating the at least one statistical measurement further comprises:

calculating, by the computing device, spectrum of at least one signal;

calculating, by the computing device, power spectral density of the at least one signal via squaring amplitude of the at least one signal;

normalizing, by the computing device, the at least one signal by a number of bins;

normalizing, by the computing device, the calculated power spectral density into a probability density function;

calculating, by the computing device, the power spectral entropy according to a standard entropy calculation formula; and determining, by the computing device, whether the normalized power spectral density indicates a forecastable series or non-forecastable noisy series.

6. An apparatus comprising:

at least one processor; and at least one memory storing instructions that, when executed by the at least one processor, cause the apparatus at least to:

receive metric data;

extract at least one time series property from the metric data;

calculate at least one statistical measurement based upon the at least one time series property, wherein the at least one statistical measurement comprises at least one of:

dispersion;

spectral density;

residual variability; and

Omega score;

perform ensemble scoring based upon the at least one statistical measurement;

generate a forecastability score based upon the ensemble scoring;

determine forecastability of the metric data based upon a comparison of the forecastability score against a preset threshold;

calculate the Omega score according to one minus a power spectral entropy, wherein calculating the Omega score as less than one indicates forecastability;

upon determining that the metric data is not forecastable, prevent metric forecasting; and upon determining that the metric data is forecastable, enable metric forecasting.

7. The apparatus of claim 6, wherein the at least one memory and the instructions, when executed by the at least one processor, further cause the apparatus at least to:

perform at least one periodic forecastability check.

8. The apparatus of claim 6, wherein the metric data comprises at least one of:

out percent utilization;

average load;

average percentage of memory used;

average response time;

average input/output operations per second total;

average input/output operations per second read;

average input/output operations per second write;

average total latency;

average read latency;

average write latency;

percentage of disk used; and any other type of metric data.

9. The apparatus of claim 6, wherein the at least one time series property comprises at least one of:

trend;

seasonality;

cyclicity;

spikes; and dips.

10. The apparatus of claim 6, wherein calculating the at least one statistical measurement further comprises:

calculating spectrum of at least one signal;

calculating power spectral density of the at least one signal via squaring amplitude of the at least one signal;

normalizing the at least one signal by a number of bins;

normalizing the calculated power spectral density into a probability density function;

calculating the power spectral entropy according to a standard entropy calculation formula; and determining whether the normalized power spectral density indicates a forecastable series or non-forecastable noisy series.

11. A non-transitory computer readable medium comprising program instructions that, when executed by an apparatus, cause the apparatus to perform at least a method comprising:

receiving metric data;

extracting at least one time series property from the metric data;

calculating at least one statistical measurement based upon the at least one time series property, wherein the at least one statistical measurement comprises at least one of:

dispersion;

spectral density;

residual variability; and

Omega score;

performing ensemble scoring based upon the at least one statistical measurement;

generating a forecastability score based upon the ensemble scoring;

determining forecastability of the metric data based upon a comparison of the forecastability score against a preset threshold;

calculating the Omega score according to one minus a power spectral entropy, wherein calculating the Omega score as less than one indicates forecastability;

upon determining that the metric data is not forecastable, preventing metric forecasting; and upon determining that the metric data is forecastable, enabling metric forecasting.

\* \* \* \* \*